Dec. 2, 1952 R. J. PERONTO 2,619,859
FISHHOOK DISLODGING AND EXTRACTING TOOL
Filed July 5, 1949
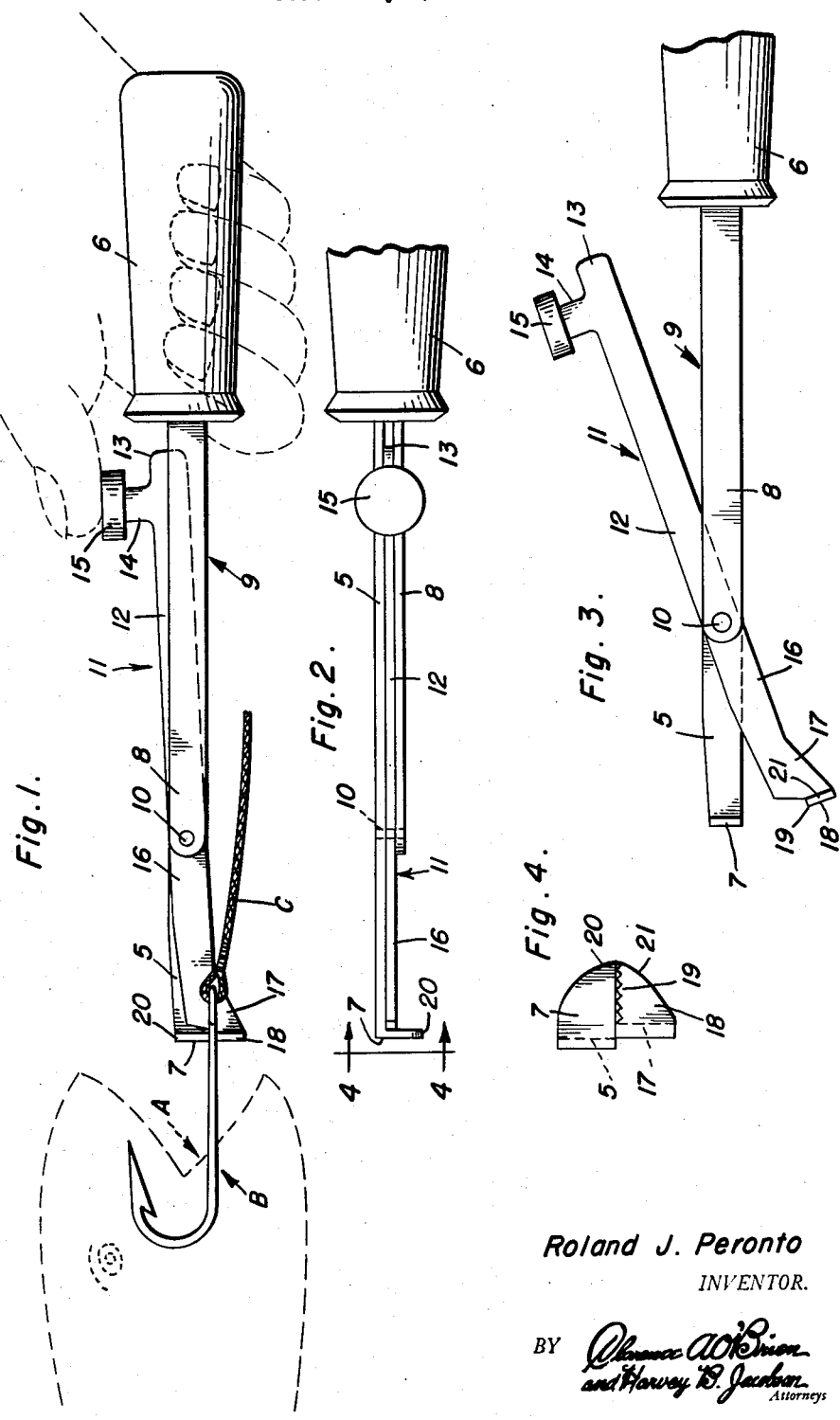
Roland J. Peronto
INVENTOR.

Patented Dec. 2, 1952

2,619,859

UNITED STATES PATENT OFFICE 2,619,859

FISHHOOK DISLODGING AND EXTRACTING TOOL

Roland J. Peronto, Manitowoc, Wis.

Application July 5, 1949, Serial No. 103,076

2 Claims. (Cl. 81—51)

The present invention relates to a novel and improved pincers-like hand tool which is expressly designed and constructed in order that it may aptly and satisfactorily serve the needs of a fisherman, who, finding it difficult to dislodge a hook from a fish mouth with his fingers, requires the assistance of a mechanical contrivance.

As the opening statement of my invention implies, it is common knowledge that many and varied styles and types of instrumentalities, implements and so-called tools have been especially devised for fish hook disgorging and dislodging purposes. Some are referred to as tongs, others as implements, and so on. Usually, the construction employed is characterized by a pair of handles or levers which are pivotally connected together and which, like common pliers, have fish hook gripping and dislodging jaws at their outer ends.

The purpose of the present invention is to structurally, functionally and otherwise improve upon fish hook dislodging tools and to achieve such end through the medium of a tool which is structurally distinct in that it has to do with a handle having bar members extending in spaced parallelism therefrom and forming a sheath, one bar member being provided with a jaw, the stationary or fixed jaw, and there being a pivoted lever, the major portion of which "jack-knifes" into the sheath and which has a protruding outer end portion carrying the complemental jaw, the one which is customarily referred to as the movable jaw.

Novelty is predicated upon the provision of the third bar or lever member which is substantially mounted for pivotal association with the sheath and which has a thumb knob at its inner end within convenient reach of the handle where it is actuable with requisite certainty and nicety.

Other objects and advantages will become more readily apparent from the following description and the accompanying illustrative drawing.

In the accompanying sheet of drawings, wherein like numerals are employed to designate like parts throughout the views:

Figure 1 is an elevational view of a pincers-type fish hook dislodging and removing tool constructed in accordance with the principles of the present invention.

Figure 2 is a top plan view of said tool with the handle fragmentarily shown.

Figure 3 is a view based on Figure 1, the view being fragmentary in form and serving to show the jaws spread apart to open positions.

Figure 4 is a slightly enlarged end view of the jaws, said view being on the line 4—4 of Figure 2, looking in the direction of the arrows.

Referring now to the drawings by distinguishing reference numerals, the first bar member, which is a flat rigid metal strip of appropriate length and cross-section, is denoted by the numeral 5 and is rigidly attached at its inner end to a wooden or equivalent hand-grip 6. The outer end of said bar member is laterally bent, as at 7, to provide a relatively stationary gripping jaw. The complemental bar member is denoted by the numeral 8 and is linearly straight and is rigidly attached at its inner or right-hand end to the hand-grip and is in spaced parallelism from the bar member 5 and the two members together define a sheath 9. It will be noted that the outer or left-hand end of bar member 8 terminates just beyond the transverse center of the bar member 5 and said outer end is riveted in spaced relation by a suitable rivet or fastener 10. The third or relatively movable bar member may best be identified as a lever 11, and this has one portion 12 pivoted on the rivet and said portion 12 folds or "jack-knifes" into the sheath 9. The inner end or terminal of said portion 12 is denoted by the numeral 13 and is provided with an outstanding lateral shank portion 14 which is, in turn, provided with a finger knob 15. The outer end of portion 16 of the lever, that is, the end portion 17, is slightly widened and somewhat wedge-shaped in form and terminates in a laterally bent jaw which is identified as the relatively movable jaw 18. This movable jaw has a serrated edge providing anti-slipping teeth 19. The marginal edge portions of the jaws 7 and 18 are curved, as at the points 20 and 21 (see Fig. 4). In Figure 1, the mouth of the fish is denoted by the reference character A, and B denotes a conventional fish hook having an eye to which the fishing line C is connected.

By placing the thumb of the hand underneath the knob 15 and lifting upwardly or outwardly on the knob, the lever 11 swings on its pivot to the open position shown in Figure 3. The jaws 7 and 18 may then be conveniently and readily engaged with the shank of the fish hook and, then, by pressing down on the finger knob 15, as shown in dotted lines in Fig. 1, and forcing the portion 12 of the lever back into the sheath 9, the jaws are brought together and firmly gripped on the shank of the fish hook, thus making it possible to clamp the fish hook between the jaws. By holding the hand-grip 6 tightly and pressing firmly down on the knob with the thumb of the same hand, the jaws are clamped against the fish hook and the fish hook may be forcibly "yanked" from the mouth of the fish, in an obvious fashion.

It will be evident from the specification and accompanying sheet of drawings that I have evolved and produced a unique hand tool which will enable the user, with little or no effort, to firmly grasp a fish hook for dislodgment purposes. In many instances, and to save time, the fish hook is pulled or "yanked" from the mouth of the fish by hand. In some instances, the fish hook is so securely lodged in the fish that there is not sufficient strength in the user's fingers or hand to do the job. This is where my tool comes in handy and experimentation has shown that it really does the job and does it well. I believe that users will find their needs fully met, contained and effectively available in the herein disclosed and claimed tool.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A fish hook grappling and dislodging tool of the class shown and described comprising a linearly straight rigid bar member having a lateral jaw at one end and having a hand-grip at the opposite end, a second bar member also linearly straight and opposed to and in spaced parallelism with the first-named bar member and having one end riveted to said first-named bar member and having its opposite end anchored in said hand-grip, said bar members being separate, one from the other, and cooperating in conjunction with said hand-grip in providing a sheath, and a lever also linearly straight from end to end pivoted between its ends on said rivet and having one end portion foldable into said sheath provided with a finger knob in close operating proximity to said hand-grip, the opposite end being in close proximity to said jaw and having a lateral jaw opposed to the first-named jaw.

2. A fish hook grappling and disgorging tool comprising a linearly straight rigid bar member having a lateral bend at one end providing a jaw, a hand-grip secured to the remaining end of said bar member, a second linearly straight and rigid bar member having one end fixed to said hand-grip, said second bar member being in spaced parallelism with said first-named bar member, the other end of said second bar member terminating in spaced relation from said jaw, a rivet piercing said other end of said second bar member and an intermediate portion of said first-named bar member, said rivet connected bar members and hand-grip combining in providing a sheath, and a lever of a length less than the length of said first named bar member and pivoted intermediate its ends on said rivet and having one end portion normally foldable into said sheath and provided with a lateral outstanding finger knob, said knob being disposed in close proximity to said hand-grip, the opposite end of said lever spanning the space between said other end of said second bar member and said jaw and terminating in a lateral jaw which is opposed to and movable toward and from the first-named jaw and is provided with gripping teeth.

ROLAND J. PERONTO.

REFERENCES CITED

The following references are of record in the file of this patent:

UNITED STATES PATENTS

| Number | Name | Date |
|---|---|---|
| 196,612 | Will et al. | Oct. 30, 1877 |
| 961,989 | Tanner | June 21, 1910 |
| 990,994 | Lee | May 2, 1911 |
| 1,795,256 | Johnson | Mar. 3, 1931 |
| 2,096,104 | Green | Oct. 19, 1937 |
| 2,124,039 | Mitchell et al. | July 19, 1938 |